(12) United States Patent
Howard

(10) Patent No.: US 9,215,892 B2
(45) Date of Patent: Dec. 22, 2015

(54) PASTEURIZATION SYSTEM FOR ROOT VEGETABLES

(71) Applicant: David Howard, Bristow, OK (US)

(72) Inventor: David Howard, Bristow, OK (US)

(73) Assignee: Unitherm Food Systems, Inc., Bristow, OK (US)

( * ) Notice: Subject to any disclaimer, the term of this patent is extended or adjusted under 35 U.S.C. 154(b) by 0 days.

(21) Appl. No.: 13/966,359

(22) Filed: Aug. 14, 2013

(65) Prior Publication Data
US 2014/0050832 A1 Feb. 20, 2014

Related U.S. Application Data

(60) Provisional application No. 61/682,846, filed on Aug. 14, 2012.

(51) Int. Cl.
| | |
|---|---|
| *A23B 4/06* | (2006.01) |
| *A23L 3/18* | (2006.01) |
| *A47J 37/04* | (2006.01) |
| *A23L 3/16* | (2006.01) |
| *A23N 15/08* | (2006.01) |
| *A23L 1/01* | (2006.01) |
| *A23L 1/212* | (2006.01) |
| *A23B 7/005* | (2006.01) |
| *A23N 12/02* | (2006.01) |
| *A23N 12/08* | (2006.01) |
| *F26B 23/02* | (2006.01) |

(52) U.S. Cl.
CPC .............. *A23L 3/185* (2013.01); *A23B 7/0053* (2013.01); *A23L 1/0128* (2013.01); *A23L 1/2123* (2013.01); *A23L 3/165* (2013.01); *A23N 12/023* (2013.01); *A23N 12/08* (2013.01); *A23N 15/08* (2013.01); *A47J 37/04* (2013.01); *A47J 37/045* (2013.01); *F26B 23/02* (2013.01)

(58) Field of Classification Search
CPC ... A23B 7/0053; A23B 1/0128; A23B 1/2123
USPC .................. 426/506, 521, 508, 520, 523, 615
See application file for complete search history.

(56) References Cited

U.S. PATENT DOCUMENTS

| | | | | |
|---|---|---|---|---|
| 2,910,392 | A * | 10/1959 | Magnuson | 426/482 |
| 7,285,299 | B1 * | 10/2007 | Howard | 426/129 |
| 2012/0015084 | A1 * | 1/2012 | Howard | 426/262 |

FOREIGN PATENT DOCUMENTS

| | | |
|---|---|---|
| BG | 61328 | 6/1997 |
| DE | 2150338 | 4/1972 |
| DE | 3743950 | 7/1989 |
| DE | 4424430 | 1/1996 |
| EP | 1290954 | 3/2003 |
| ES | 2238143 | 8/2005 |
| WO | 9923894 | 5/1999 |
| WO | 2009003545 | 1/2009 |

* cited by examiner

*Primary Examiner* — Preston Smith
(74) *Attorney, Agent, or Firm* — GableGotwals

(57) ABSTRACT

A system and method for pasteurizing the surface of a food product includes a flame pasteurizing means arranged to transfer heat to an outer layer of the food product as it is carried by a cook belt. The flame pasteurizing means provides a medium that engulfs more than 50% of the surface area of the skin or outer layer and raises the temperature of the outer layer to at least 145° F. (about 62.8° C.). A washing means, arranged at an exit point of the flame pasteurizing means, removes the raised temperature outer layer and stops heat transfer to an adjacent inner layer of the food product. The pasteurized and washed product retains the same color and flavor as that of the unpasteurized product.

8 Claims, 7 Drawing Sheets

PASTEURIZATION SYSTEM FOR ROOT VEGETABLES

CROSS REFERENCE TO PENDING APPLICATIONS

This application claims priority to U.S. Prov. Pat. Appl. Ser. No. 61/682,846, filed on Aug. 14, 2012.

BACKGROUND OF THE INVENTION

This invention generally relates to systems, apparatuses, and methods for pasteurizing the surface of pre-cooked food products and, more particularly, to pasteurizing the surface of root vegetables, namely, onions.

The processing of root vegetables for added value has changed dramatically over the last 25 years, and the growth in this processing has extended from food service to restaurants and to retail. While root vegetables continue to be harvested and sold at market or in supermarket stores, there is a growing demand for convenience in utilizing root vegetables. This can be seen in supermarkets by the availability of ready meals containing root vegetables. At the back end of kitchens, root vegetables now arrive pre-cut and ready to use. Advances in mechanical handling and peeling processes have evolved to support the demand.

Over the course of the last 15 years there have been an increasing number of food product recalls related to members of the public getting sick from cross-contamination of product. In the pre-cooked delicatessen market segment, Unitherm Food Systems, Inc. (Bristow, Okla., US, and Ashford, Kent, England) has been successful at pasteurizing the surface of pre-cooked products. However, there has been a growth in cross-contamination stemming from either vegetables or produce grown in the field. One vegetable in particular, onions, has been a source of this contamination.

When root vegetables like onions are planted and then harvested, they are exposed to pathogens found in the soil and around farmland, and the root vegetables can carry those pathogens on their surface. The pathogens then have an opportunity to grow because many root vegetables are stored for months prior to being transported to places for sale, like the supermarket where the onion is fully shelled as it left the field, or to be processed for use in a further-processed food product.

When used in a further-processed food product, the onion is typically passed through a peeling process or machine like that sold by Sormac (Venlo, The Netherlands). The Sormac machine is successful at peeling but it does not clean the surface for pathogens. Additionally, the machine removes up to 10 to 20% of the weight of the onion.

Peeled onions are typically sold to a processor, like a food factory which specializes in making soup. In some cases, the processor may peel the onions for use within its own factory. Regardless of whether the onions are purchased peeled or peeled in-house, the onions are exposed to cross-contamination when being peeled. This exposure occurs when an outer surface is contacted by a blade which has a pathogen on it, and the blade transfers the pathogen into the onion. In addition, the equipment can be contaminated by the pathogen coming off the surface of the onion and onto a contact surface of the equipment. This then means that all products traveling down the contact surface can be cross-contaminated.

Absent from the market is a system and method to eliminate pathogens at the processing facility. A flame pasteurizer made and practiced according to this invention is designed to ensure product that has been picked or harvested from the field can be pasteurized before being chopped, diced, or sliced. The invention fills the essential need to ensure that mass produced foods have an intervention step that kills pathogens.

SUMMARY OF THE INVENTION

A system and process made according to this invention pasteurizes the surface of the root vegetable by engulfing it in fire so as to burn off the exterior layer or skin. After pasteurizing, the product can be washed or cleaned to leave a product that does not show roasted or charred characteristics. Organoleptically, there should be no noticeable flavor change in the product to the layperson. Thus, an onion flame pasteurized according to this invention and washed afterwards is essentially the same with respect to color and flavor as an onion that has had the outermost layer removed by mechanical means.

Objects of the invention are to: (1) pasteurize the surface of a root vegetable such as, but not limited to, all types or varieties of beets, carrots, garlic, onions, parsnips, potatoes, shallost, rutabaga, turnips and yams; (2) reduce or eliminate pathways for cross-contamination; (3) reduce or eliminate the need for mechanical peeling; (4) reduce the amount of shrinkage relative to peeling processes; and (5) pasteurize the surface in such a way as to leave color, after washing, and flavor unaltered.

DETAILED DESCRIPTION OF THE PREFERRED EMBODIMENT

This application incorporates by reference the subject matter of U.S. application Ser. No. 12/631,497 (Apparatus and Method for Searing, Branding, and Cooking, filed Dec. 4, 2009) and Ser. No. 12/836,886 (Method, Continuous Apparatus, and Burner for Producing a Surface-Roasted Product, filed Jul. 15, 2010).

Figure 2:
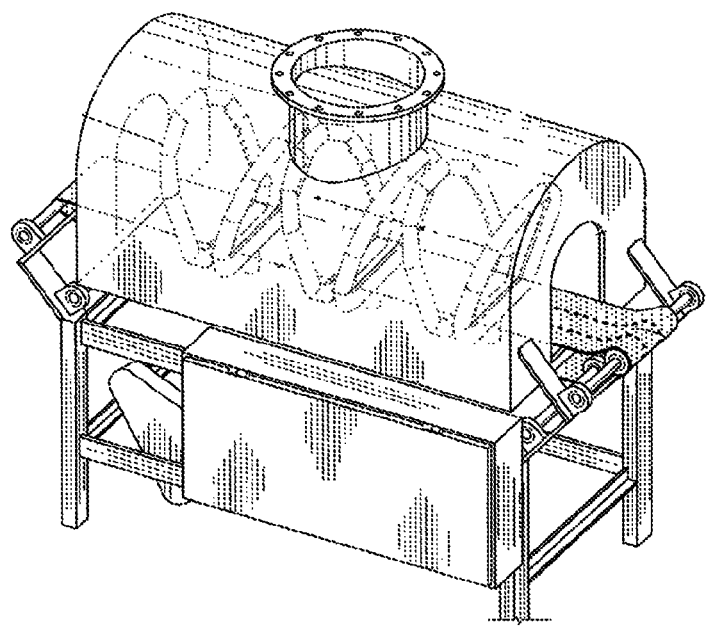
FIG. 2 is a perspective view of a continuous surface roasting apparatus suitable for use in the system and process of this invention. The surface roasting apparatus includes a series of loop burner elements arranged at oblique angles to the cook belt.
Figure 3:
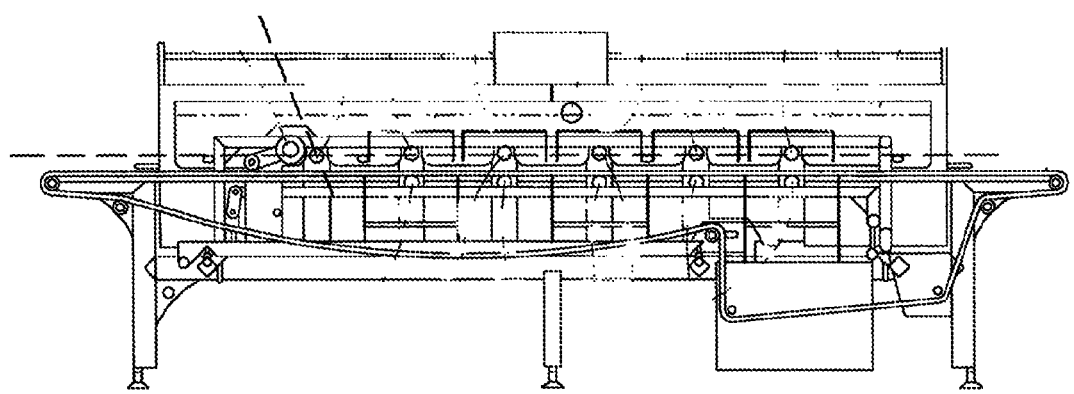
FIG. 3 is a cutaway elevational side view of a flame grill apparatus suitable for use in the system and process of this invention. The flame grill apparatus combines searing and branding.

A pasteurization system and process made according to this invention preferably makes use of a flame pasteurizer. A continuous flame grill or roaster such as the UNITHERM® Flame Grill™ (see FIG. 2) or Tunnel of Fire™ roaster (see FIG. 3) (Unitherm Food Systems, Inc., Bristow, Okla.) or its equivalent is a preferred flame pasteurizer.

The flame pasteurizer should heat the surface of the root vegetable or product to a temperature sufficient to kill pathogens on the surface (at least 145° F. or about 62.8° C.), and the product should remain in the flame pasteurizer for a sufficient time to achieve at least a 1 log reduction *Listeria monocytogenes* and alternate pathogens such as *Salmonella, E. Coli*, and other bacteria.

Preferably, the residence time for onions should be at least 30 seconds and no greater than 90 seconds; with 45 to 60 seconds being ideal. Some variance may occur based on onion size and temperature.

The flame should make contact on the surface of the product and engulf a minimum of at least 65 percent of the total surface area. Ideally, 100 percent of the surface area should be contacted and engulfed by the flame. Preferably, the flame pasteurizer should have the ability to change the angle of flame from burner-to-burner to ensure heat-treatment of all exposed surfaces. For example, the burner could be arranged at an angle in the range of 5° to 60° from vertical. A first burner could be arranged at −X° from vertical and a second burner could be arranged at +Y° from vertical, where X and Y are the angle from vertical (see FIG. 2). Preferably, X and Y are the same magnitude.

Figure 1:
FIG. 1 is a photograph of onions after being treated by a system and process made according to this invention. This particular variety of onion is just one example of the types of onions and other root vegetables that can be treated by the system and process.

The surface of the product (e.g., an onion's outer layer, a carrot's or potato's skin) should be completely burned up to at least the outermost layer and controlled by time to leave the membrane under the first layer intact or mostly intact (see e.g., FIG. 1). Once the product is pasteurized, the membrane can then be removed mechanically or manually to leave a product that does not appear to have been flame pasteurized.

Once the product exits the flame pasteurizer it can be transferred as part of a continuous process without human intervention. This limits the possibly of re-contamination.

At the discharge opening or exit of the flame pasteurizer, the surface of the product can be rinsed by spraying, deluging or submerging with clean, bacteria-free water to inhibit further heat transfer to the core, control the burn, and end the pasteurization process. Product that is not subjected to water at the end of the flaming process can continue to burn.

The core temperature of the product should be unaffected between the entrance point to the flame pasteurizer and the exit point from the water application. For example, product entering with a core temperature of 50° F. (10° C.) would exit from the water application with that same core temperature.

In order for this process to work, and using onions as an example, the onions must be individually separated or have space around them (e.g., 10 or 20 onions evenly spaced across a belt, one-level deep) as the onions pass through a ribbon flame or burner arrangement like that disclosed in the above patent applications. A continuous ribbon burner that encircles the cook belt is a preferred burner.

In other embodiments of the invention, a gas infrared system that operates at surface temperatures of 1,000° F. or higher can ignite the skin of the onion for a similar effect. However, systems in the above patent applications are preferred because each makes use of a ribbon flame which fully engulfs the outer layer, ignites it, and burns the circumference sufficiently to achieve lethality. While infrared would work on a single-lane, the shadowing for multiple lanes could leave cold spots on which pathogens survive.

As mentioned above, a product pasteurized by this system and process typically requires a quick wash to ready it for further processing. Shrinkage is reduced relative to peeling processes. In tests conducted by the inventor, shrinkage was in the range of about 3 to 5% by weight.

TEST RESULTS

Objective

The objective of this test was to process whole onions:
1. in a gas flame-fired grill at Unitherm Food Systems, Inc. (Bristow, Okla.) ("Unitherm") for microbial testing of process effectiveness on indigenous microorganisms (aerobic plate count, yeast and mold).
2. in a gas flame-fired grill at Unitherm for microbial testing of process effectiveness on non-pathogenic *Listeria innocua*-inoculated onions.
3. in a pilot-plant scale oven at the Robert M. Kerr Food & Agricultural Products Center (Stillwater, Okla.) ("FAPC") to mimic the commercial process and test its effectiveness against *Listeria monocytogenes*.

Method

Indigenous bacteria on the surface of onions were plated on nonselective Tryptic Soy Agar (TSA). A non-pathogenic, antibiotic resistant strain of *Listeria innocua* will also be used to inoculate onions (24-hrs in advance of use) for processing through commercial ovens at Unitherm Food Systems manufacturing facility.

For processing in the pathogen-processing lab at the Robert M. Kerr Food & Ag Products Center (Stillwater, Okla.), four strains of pathogenic *L. monocytogenes* (Scott A-2, serotype 4b, clinical isolate; V7-2, serotype 1/2a, clinical isolate; 39-2 retail hotdog isolate; 383-2 ground beef isolate) were used for inoculation of whole onions for processing on pilot plant scale equipment that mimics the commercial process.

The *Listeria* strains are all resistant to streptomycin (100 µg/ml) and rifamycin S/V (10 µg/ml). Samples were plated on general-purpose agar (TSA) containing these antibiotics for selective enumeration of our inoculum on non-sterile product (i.e., this precludes the enumeration of other contaminating bacteria).

Natural, whole onions (with their indigenous microflora) as well as surface-inoculated onions were inoculated with either *Listeria innocua* (at Unitherm) or a 4-strain cocktail of *L. monocytogenes* (at FAPC). Plating was performed on Potato Dextrose agar for enumeration of yeast and mold. The process was evaluated by microbial enumeration of pre-process and postprocess levels of organisms.

Processing included preliminary trials to determine approximate processing times that would be used for microbial process testing.

A gas-fired flame oven at Unitherm was used for testing for lethality on indigenous organisms on onions and onions inoculated with nonpathogenic *Listeria innocua*. Testing of onions in a mimic system at the food pathogen processing lab at FAPC was performed on indigenous organisms (for comparison of processes) as well as pathogen-inoculated onions using 4-strain cocktail of *Listeria monocytogenes*.

Data from the microbial recovery trials at different processing times were analyzed by One-Way Analysis of Variance using the Holm-Sidak Test for pairwise comparisons for significant difference in comparison with unprocessed onions.

Process

Figure 5:
FIG. 5 is a photograph of the as-delivered onions prior to being flame pasteurized.

Onions (see FIG. 5) were obtained locally (Sunset brand, white onions, #4663) and were approximately 0.6-0.7 lbs/each). They were held at room temperature prior to processing.

Figure 4:
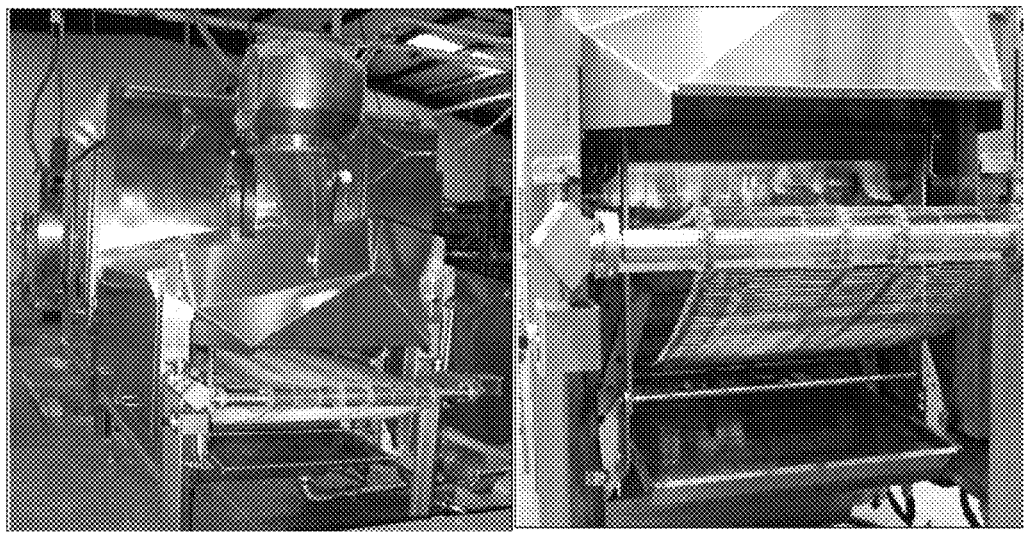
FIG. 4 is a photograph of a flame grill apparatus used in testing a preferred embodiment of the system and process of this invention.
Figure 6:
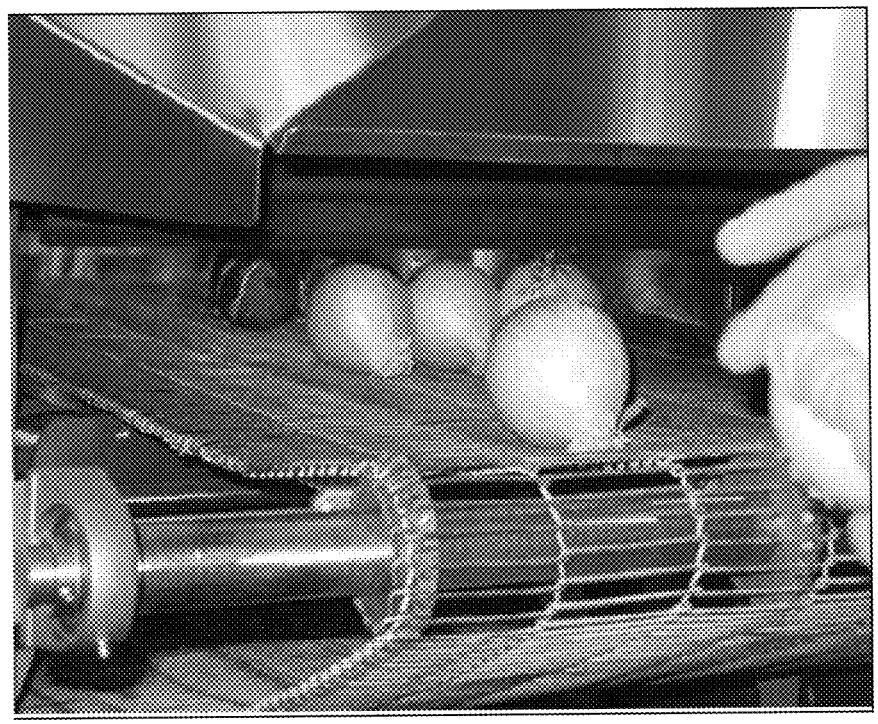
FIG. 6 is a photograph of the onions loaded on a cook belt at the entry point to the flame pasteurizer.

A flame oven with continuously moving conveyor belt transported onions through the gas flame grill (see FIGS. 4 & 6). A clean-in-place system was in place but not used. Workers wore nitrile laboratory gloves to place onions on the grill; other workers removed onions and placed them two-to-a-bag for microbial processing (see FIGS. 9 & 11).

Figure 11:
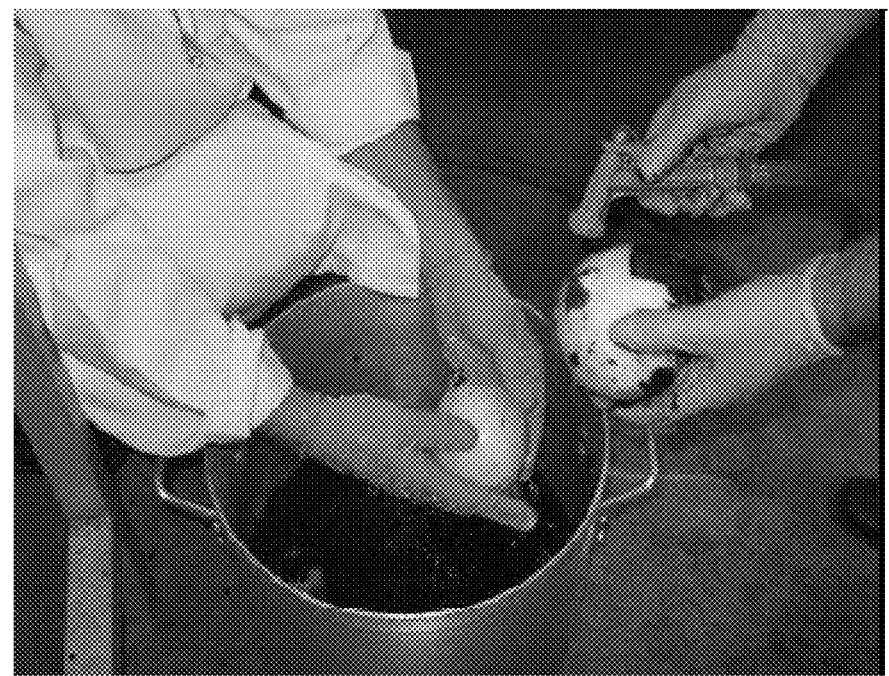
FIG. 11 is a photograph of the flame-pasteurized onions being rinsed by a hose/water spray to remove the black ash prior to microbial sampling.

One additional set of onions were rinsed by hose/water spray to remove the black ash prior to microbial sampling (see FIG. 11). A 50-ml rinse was added to each bag of two onions, hand massaged for 3-5 min, and then approximately a 10-ml sample was removed for microbial testing; the sample was placed on ice and transported to FAPC for microbial sampling later the same day.

Figure 12:
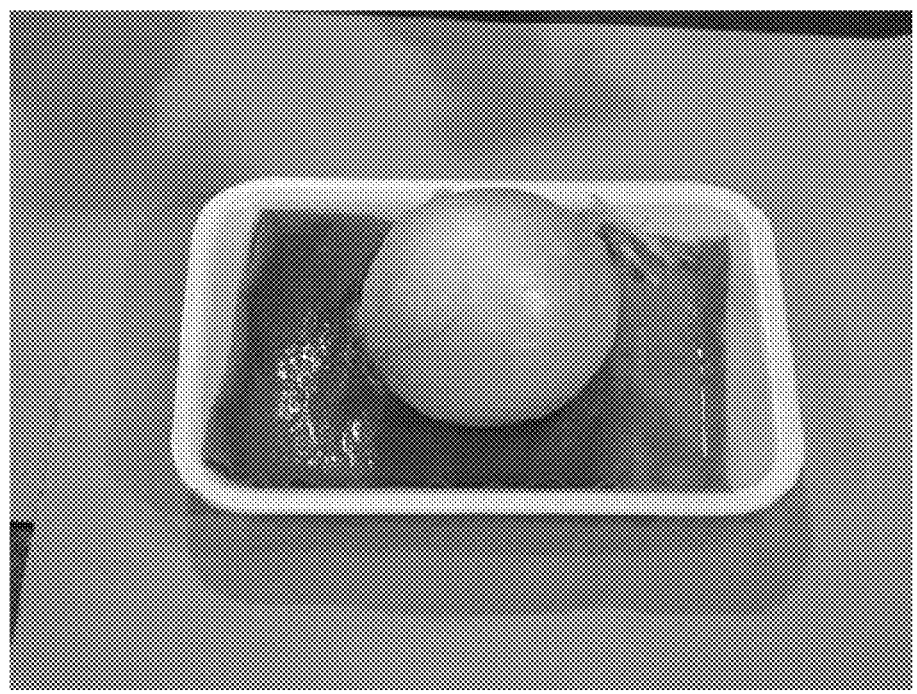
FIG. 12 is a photograph of an additional set of additional set of onions inoculated by rolling the onion in a white plastic tray lined with absorbant paper towels to which 60 mls of non-pathogenic *Listeria innocua* (10 ml test tube of *L. innocua*+50 ml 0.1% BPW diluent) was added.

An additional set of onions were inoculated by rolling the onion in a white plastic tray lined with absorbent paper towels to which 60 mls of non-pathogenic *Listeria innocua* (10 ml test tube of *L. innocua*+50 ml 0.1% BPW diluent) was added; this was replaced with a fresh inoculum solution after processing 4 onions (see FIG. 12). The inoculated onions were placed on the conveyor belt and processed in a similar fashion as the prior onions. The equipment was sanitized by a hypochlorite bleach solution.

Results

Figure 7:
FIG. 7 is photograph of the onions as they approach the exit point of the flame pasteurizer.
Figure 8:
FIG. 8 is another photograph of the onions as they approach the exit point of the flame pasteurizer.
Figure 9:
FIG. 9 is a photograph of two onions after each has been flame pasteurized.
Figure 10:
FIG. 10 is a photograph of the flame-pasteurized onions placed two-to-a-bag for microbial processing.
Figure 13:
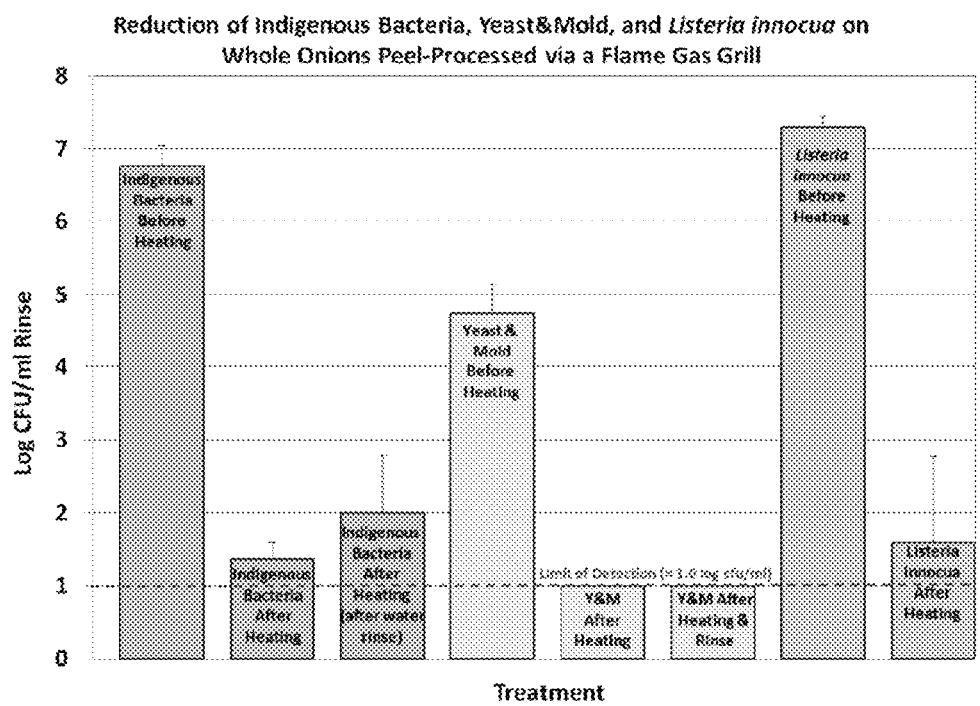
FIG. 13 is a chart showing the reduction of indigenous bacteria, yeast and mold, and *Listeria innocua* on the flamed-pasteurized onions.

The flame grill does an effective job at 'burning off' the outer paper-like layer of the onions without damaging the onion 'meaty' layers (see FIGS. 7-9). This will very likely reduce waste and increase yield of the process compared to mechanical peelers that remove a considerable amount of the onion "meat." The process achieved a nearly 5-log reduction of indigenous bacterial contamination, 4-log reduction of yeast and mold (below level of detection after processing), and a 6-log reduction of inoculated *Listeria innocua* (see FIG. 13).

Although some residual contamination was obtained after heating. This could be due to non-aseptic handling by gloved workers and by the 'hairy root' region of the onion which may be more difficult to eliminate indigenous/inoculated organisms.

What is claimed is:

1. A method for pasteurizing the surface of a root vegetable, the method comprising the steps of:
   arranging a plurality of root vegetables on a cook belt, each root vegetable being in a raw and unpeeled state; and
   passing the root vegetables through a flame pasteurizing means, the flame pasteurizing means arranged to engulf and ignite more than 65% of the surface area of the outer layer of each root vegetable regardless of location on the cook belt, raise the temperature of the outer layer to at least 145° F. (about 62.8° C.), and burn the outer layer; and
   passing the flame-pasteurized root vegetable through a washing means, the washing means removing any remaining portion of the burned outer layer but not removing an adjacent inner layer and stopping heat transfer to the adjacent inner layer of the flame-pasteurized root vegetable.

2. A method according to claim 1 wherein a core temperature of the root vegetable remains unchanged between an entry point of flame pasteurizing and exit point of washing.

3. A method according to claim 1 wherein the root vegetable resides between an entry point to the flame pasteurizing and the exit point of the flame pasteurizing for an amount of time required to achieve at least a 1 log reduction in a pathogen residing on the outer layer of the root vegetable.

4. A method according to claim 1 wherein the root vegetable resides between an entry point to the flame pasteurizing and the exit point of the flame pasteurizing for at least 30 seconds and no longer than 90 seconds.

5. A method according to claim 4 wherein the root vegetable resides between the entry to the flame pasteurizing and the exit point of the flame pasteurizing for at least 45 seconds and no longer than 60 seconds.

6. A method according to claim 1 wherein the flame pasteurizing includes at least one continuous ribbon burner arranged about the cook belt.

7. A method according to claim 6 wherein the at least one continuous ribbon burner is arranged at an oblique angle to the cook belt.

8. A method according to claim 1 wherein the amount of weight loss of the root vegetable after passing through the system is no more than 5%.

* * * * *